(12) United States Patent
Chen et al.

(10) Patent No.: US 7,632,426 B2
(45) Date of Patent: Dec. 15, 2009

(54) LIQUID CRYSTAL COMPOSITION

(75) Inventors: Xinhua Chen, Erie, CO (US); Yu-Ying Hsieh, Kaohsiung Hsien (TW)

(73) Assignee: Daily Polymer Co., Ltd., Kaohsiung Hsien (TW)

( * ) Notice: Subject to any disclaimer, the term of this patent is extended or adjusted under 35 U.S.C. 154(b) by 0 days.

(21) Appl. No.: 12/014,468

(22) Filed: Jan. 15, 2008

(65) Prior Publication Data

US 2008/0258107 A1    Oct. 23, 2008

Related U.S. Application Data

(63) Continuation-in-part of application No. 11/327,593, filed on Jan. 6, 2006, now abandoned.

(51) Int. Cl.
*C09K 19/30*    (2006.01)
*C09K 19/12*    (2006.01)
(52) U.S. Cl. ............................ 252/299.63; 252/299.66
(58) Field of Classification Search ............ 252/299.63, 252/299.66
See application file for complete search history.

(56) References Cited

U.S. PATENT DOCUMENTS

| | | | |
|---|---|---|---|
| 7,045,176 B2 * | 5/2006 | Yun et al. | 428/1.1 |
| 7,063,805 B2 * | 6/2006 | Ban | 252/299.63 |
| 7,220,368 B2 * | 5/2007 | Ban | 252/299.63 |

* cited by examiner

*Primary Examiner*—Shean C Wu
(74) *Attorney, Agent, or Firm*—Greenlee, Winner and Sullivan, P.C.

(57) ABSTRACT

A liquid crystal composition includes:
20 to 50 wt % of compound (A)

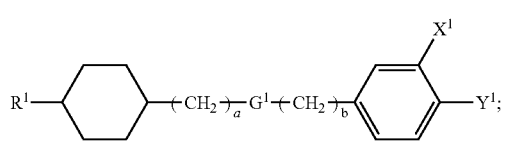

0 to 20 wt % of compound (B)

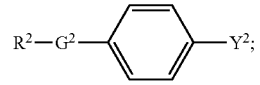

20 to 50 wt % of compound (C)

$R^3$—$G^3$—$M^1$—$R^4$    (C);

1 to 15 wt % of compound (D)

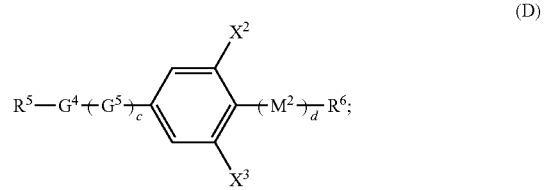

and
5 to 15 wt % of compound (E)

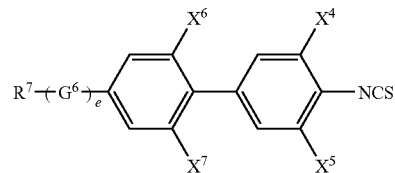

wherein $G^1$, $G^2$, $G^3$, $G^4$, $G^5$, $G^6$, $M^1$, and $M^2$ are independently phenylene or cyclohexylene; $R^1$, $R^2$, $R^3$, $R^4$, $R^5$, $R^6$, and $R^7$ are independently a straight-chain or branched-chain alkyl group having 1 to 7 carbon atoms or an alkenyl group having 2 to 7 carbon atoms, where the alkyl group is optionally substituted and can be replaced with at least one fluorine atom; $X^1$, $X^2$, $X^3$, $X^4$, $X^5$, $X^6$, $X^7$, $Y^1$, and $Y^2$ are independently H, F, Cl, $CF_3$, or $OCF_3$; a and b are independently 0, 1 or 2; c is 0 or 1; d is 0 or 1, but c+d≧1; and e is 0, 1 or 2.

15 Claims, No Drawings

LIQUID CRYSTAL COMPOSITION

CROSS-REFERENCE TO RELATED APPLICATION

This application is a continuation-in-part (CIP) of U.S. patent application Ser. No. 11/327,593, filed on Jan. 6, 2006, the entire disclosure of which is incorporated herein by reference.

BACKGROUND OF THE INVENTION

1. Field of the Invention

This invention relates to a liquid crystal composition, more particularly to a liquid crystal composition providing low rotational viscosity and high response speed.

2. Description of the Related Art

Liquid crystal displays presently in practical use can be classified into a twisted nematic (TN) liquid crystal display twisted by 90°, a super twisted nematic (STN) liquid crystal display twisted by 180° or more, and a liquid crystal display utilizing thin film transistors (TFT). It is well known that a single liquid crystal compound usually cannot satisfy a liquid crystal display to function appropriately. Therefore, a liquid crystal composition including different liquid crystal compounds is usually employed. In general, the liquid crystal composition is required to provide appropriate physical properties, e.g., refractive anisotropy ($\Delta n$), dielectric anisotropy ($\Delta \varepsilon$), rotational viscosity ($\gamma$), and elastic constant ratio ($K_{33}/K_{11}$, $K_{33}$ is bend elastic constant, $K_{11}$ is splay elastic constant). For example, in a TFT display, the liquid crystal composition is required to provide a higher clearing point, a larger dielectric anisotropy, a larger refractive anisotropy, a low rotational viscosity, chemical stability, and a high voltage holding ratio (VHR). Lower rotational viscosity provides the display with a higher response speed.

In co-pending U.S. patent application Ser. No. 11/327,593, the applicant discloses a liquid crystal composition that includes:

10-90% by weight of one or more compounds of Type I having formula

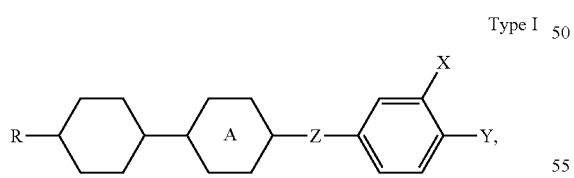

Type I 1-40% by weight of one or more compounds of Type II having formula

Type II 1-50% by weight of one or more compounds of Type III having formula

Type III and 1-40% by weight of one or more compounds of Type IV having formula

Type IV wherein in the formulas, rings A and B are independently phenylene or cyclohexylene; Z is a direct bond (no additional carbon atoms) or ethylene; n=1 or 2; m=0 or 1; and n+m>1; R and R' are optionally substituted alkyl groups with 1-7 carbons in the chain, where the alkyl groups may be straight chain or branched, and one or more hydrogens can be replaced with one or more F or D atoms, and one or more carbon atoms can be replaced with —O; X and Y are selected from the group consisting of: F, H, Cl, and $CF_3$ group.

Although the liquid crystal composition of the co-pending US patent application provides good physical properties, the rotational viscosity thereof still needs to be improved so as to achieve higher response speeds.

SUMMARY OF THE INVENTION

Therefore, the object of the present invention is to provide a liquid crystal composition that can provide a low rotational viscosity and a high response speed.

According to this invention, a liquid crystal composition includes:

20 to 50 wt % of compound (A)

(A)

0 to 20 wt % of compound (B)

(B)

20 to 50 wt % of compound (C)

$R^3-G^3-M^1-R^4$ (C);

1 to 15 wt % of compound (D)

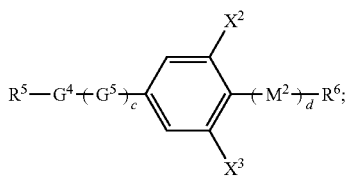

and
5 to 15 wt % of compound (E)

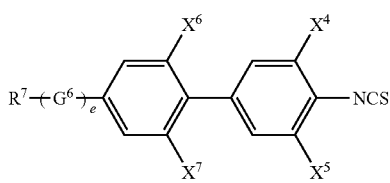

wherein $G^1$, $G^2$, $G^3$, $G^4$, $G^5$, $G^6$, $M^1$, and $M^2$ are independently phenylene or cyclohexylene; $R^1$, $R^2$, $R^3$, $R^4$, $R^5$, $R^6$, and $R^7$ are independently a straight-chain or branched-chain alkyl group having 1 to 7 carbon atoms or an alkenyl group having 2 to 7 carbon atoms, where the alkyl group is optionally substituted and can be replaced with at least one fluorine atom; $X^1$, $X^2$, $X^3$, $X^4$, $X^5$, $X^6$, $X^7$, $Y^1$, and $Y^2$ are independently selected from the group consisting of H, F, Cl, $CF_3$, and $OCF_3$; a and b are independently 0, 1 or 2; c is 0 or 1; d is 0 or 1, but $c+d \geq 1$; and e is 0, 1 or 2.

DETAILED DESCRIPTION OF THE PREFERRED EMBODIMENTS

The preferred embodiment of a liquid crystal composition according to the present invention includes 20 to 50 wt % of at least one compound (A) represented by the formula

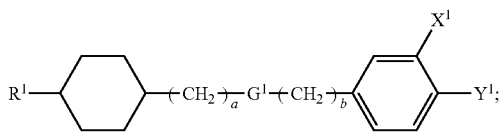

0 to 20 wt % of at least one compound (B) represented by the formula

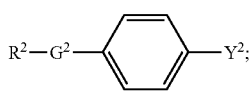

20 to 50 wt % of at least one compound (C) represented by the formula

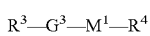

1 to 15 wt % of at least one compound (D) represented by the formula

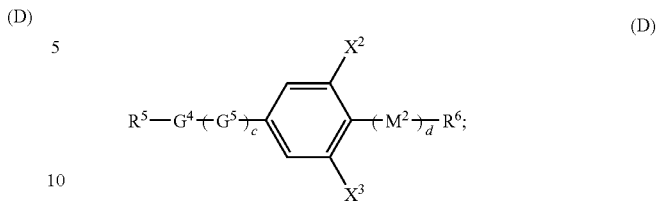

and
5 to 15 wt % of at least one compound (E) represented by the formula wherein $G^1$, $G^2$, $G^3$, $G^4$, $G^5$, $G^6$, $M^1$, and $M^2$ are independently phenylene or cyclohexylene; $R^1$, $R^2$, $R^3$, $R^4$, $R^5$, $R^6$, and $R^7$ are independently a straight-chain or branched-chain alkyl group having 1 to 7 carbon atoms or an alkenyl group having 2 to 7 carbon atoms, where the alkyl group is optionally substituted and can be replaced with at least one fluorine atom; $X^1$, $X^2$, $X^3$, $X^4$, $X^5$, $X^6$, $X^7$, $Y^1$, and $Y^2$ are independently selected from the group consisting of H, F, Cl, $CF_3$, and $OCF_3$; a and b are independently 0, 1 or 2; c is 0 or 1; d is 0 or 1, but $c+d \geq 1$; and e is 0, 1 or 2.

Preferably, $R^1$, $R^2$, $R^3$, $R^4$, $R^5$, $R^6$, and $R^7$ are independently a straight-chain or branched-chain alkyl group having 2 to 5 carbon atoms or an alkenyl group having 2 to 4 carbon atoms. The alkyl group is preferably un-substituted or substituted by a fluorine atom.

Preferably, the compound (A) is selected from the group consisting of:

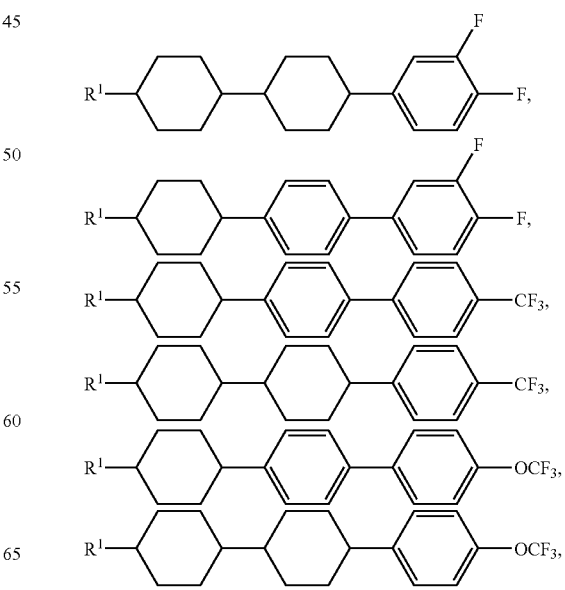

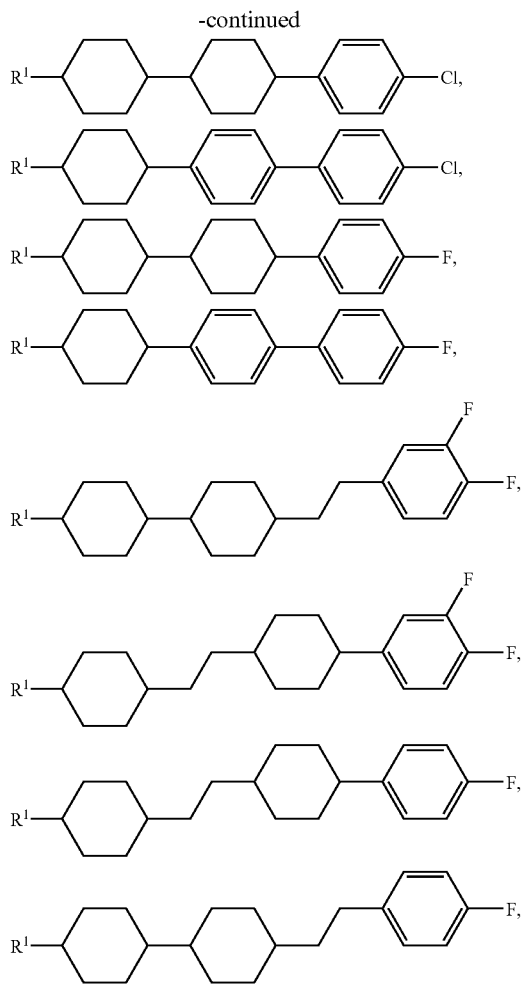
and combinations thereof.
Examples of the compound (A) include:
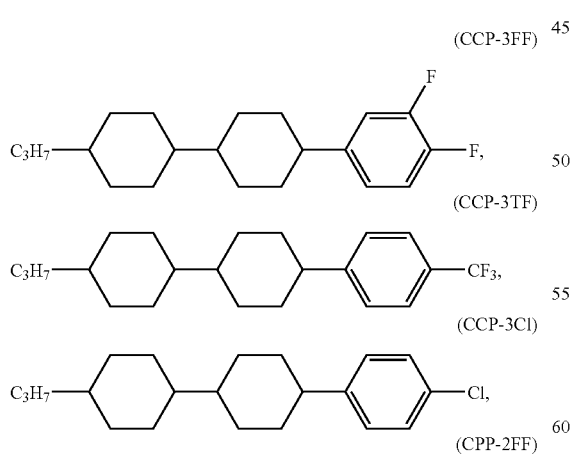
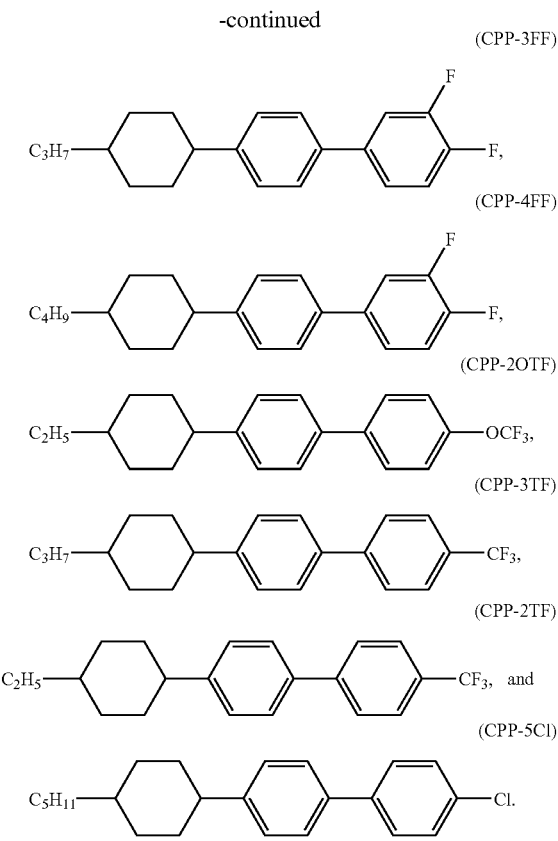
It should be noted that each compound is abbreviated, e.g., CCP-3FF indicates two cyclohexylene groups, one phenylene group, 3 carbons for R, and two fluorine atoms.
Preferably, the compound (B) is selected from the group consisting of:
and
combinations thereof.
Examples of the compound (B) include:
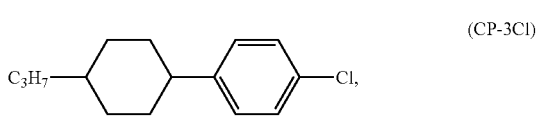

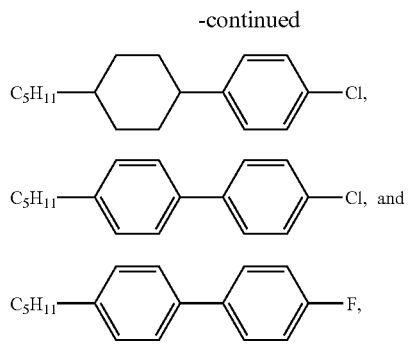
(CP-5Cl)
(PP-5Cl)
(PP-5F)

Preferably, the compound (C) is selected from the group consisting of:

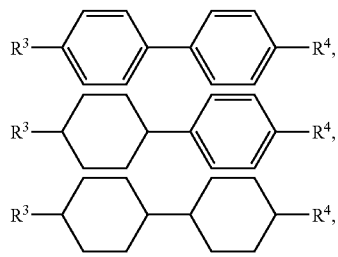

and combinations thereof.

Examples of the compound (C) include:

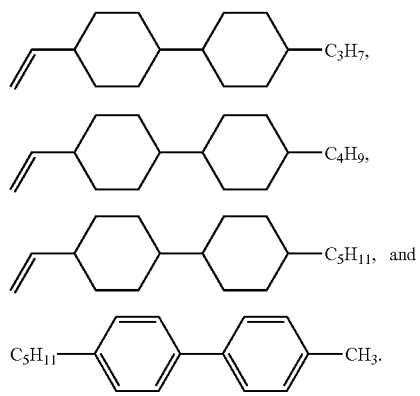
(CC-2D3)
(CC-2D4)
(CC-2D5)
(PP-5l)

Preferably, the compound (D) is selected from the group consisting of:

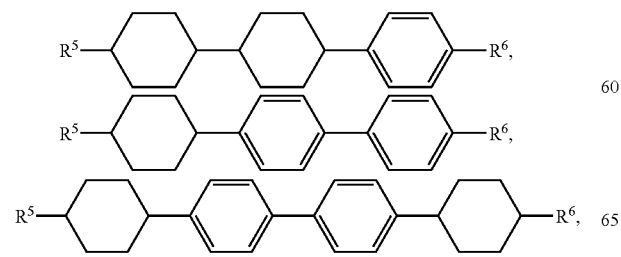

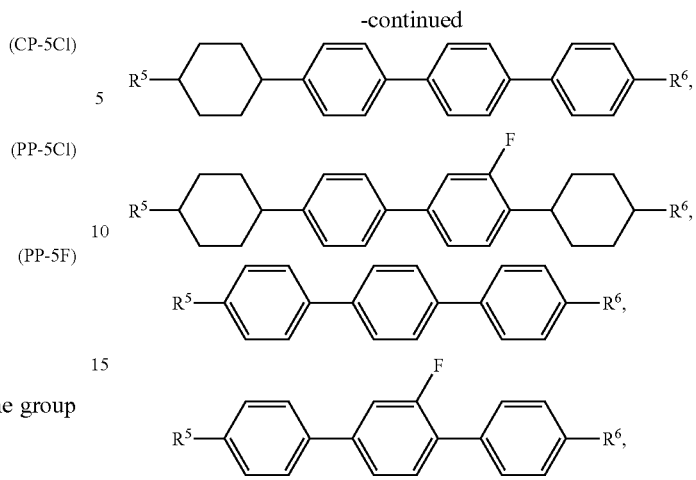

and combinations thereof.

Examples of the compound (D) include:

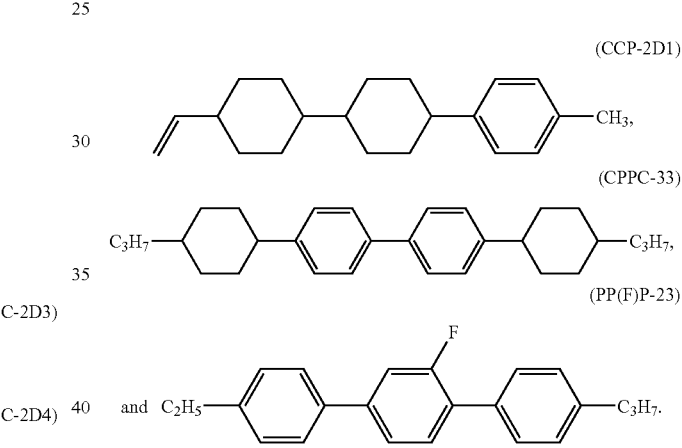
(CCP-2D1)
(CPPC-33)
(PP(F)P-23)

Preferably, the compound (E) is selected from the group consisting of:

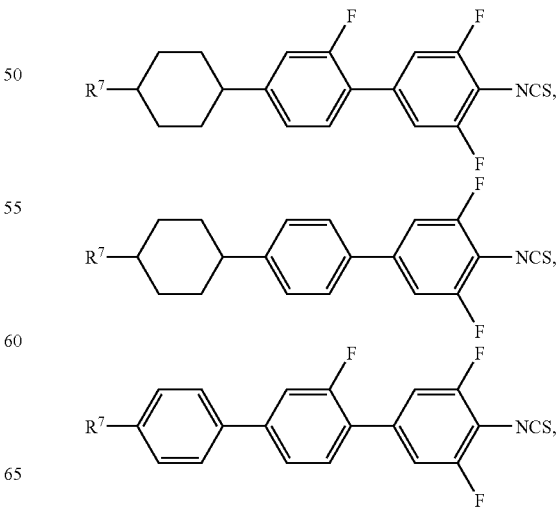

-continued

[Chemical structures with R⁷ groups and NCS substituents]

and combinations thereof.

Preferably, the compound (E) is

(PP-3NCSFF)

The liquid crystal composition of this invention has a rotational viscosity less than 70 mPa·s at 25° C. Preferably, the rotational viscosity ranges from 5 to 70 mPa·s, more preferably, from 40 to 70 mPa·s.

The liquid crystal composition of this invention is in the liquid crystal phase at −20 to 70° C. That is, the liquid crystal composition of this invention has a clearing point greater than 70° C. Preferably, the clearing point is 77.9° C. In addition, the liquid crystal composition of this invention has the following properties: Δn ranging from 0.100 to 0.130 under a wavelength of 589 nm, Δ∈ greater than 3.4 (preferably up to 4.68), and a voltage holding ratio greater than 99%.

EXAMPLES

Method for Producing Liquid Crystal Compositions of Examples 1 to 5

The liquid crystal compositions of Examples 1 to 5 were obtained by mixing compounds listed in Table 1. In each example, the amount of each of the compounds was calculated based on the total weight of the liquid crystal composition (100 wt %).

TABLE 1

|  | Example 1 | Example 2 | Example 3 | Example 4 | Example 5 |
|---|---|---|---|---|---|
| Compound A (wt %) | CCP-3FF (4.3) | CCP-3FF (4.03) | CPP-2FF (7.6) | CPP-2FF (7.5) | CPP-2FF (4.9) |
|  | CPP-3FF (16.5) | CPP-2FF (1.24) | CPP-3FF (13.9) | CPP-3FF (10.2) | CPP-3FF (9.1) |
|  | CCP-3TF (5.9) | CPP-3FF (4.20) | CPP-4FF (5.8) | CPP-4FF (8.6) | CCP-3TF (3.0) |
|  | CPP-2OTF (6.5) | CCP-3TF (5.42) | CPP-3TF (4.4) | CCP-3Cl (3.1) | CPP-2TF (2.7) |
|  | CPP-3TF (5.2) | CPP-2TF (7.24) | CCP-3Cl (4.9) | CPP-5Cl (5.7) | CPP-3TF (4.0) |
|  | CPP-3Cl (6.8) | CCP-3Cl (3.46) | CPP-5Cl (2.8) |  | CPP-2OTF (7.1) |
|  |  | CPP-5Cl (2.51) | CPP-3F (6.0) |  | CCP-3Cl (3.9) |
| Compound B (wt %) | CP-5Cl (18.9) | — | CP-3Cl (2.7) | PP-5F (11.2) | PP-5Cl (3.2) |
| Compound C (wt %) | CC-2D5 (25.7) | CC-2D3 (23.87) | CC-2D3 (37.7) | CC-2D3 (29.8) | CC-2D3 (39.4) |
|  |  | CC-2D4 (23.86) | PP-51 (5.3) |  | PP-51 (5.1) |
| Compound D (wt %) | CPPC-33 (4.0) | CCP-2D1 (11.00) | PP(F)P-23 (3.8) | CCP-2D1 (7.7) | CCP-2D1 (8.2) |
|  |  | CPPC-33 (3.07) |  | CPPC-33 (5.2) | CPPC-33 (3.5) |
| Compound E (wt %) | PP-3NCSFF (6.2) | PP-3NCSFF (10.1) | PP-3NCSFF (5.1) | PP-3NCSFF (11.0) | PP-3NCSFF (5.9) |

The clearing point, the refractive anisotropy, the dielectric anisotropy, the rotational viscosity, and the voltage holding ratio of each of the liquid crystal compositions were measured. Refractive anisotropy (Δn) was measured using Abbe refractometer at 589.3 nm. Dielectric anisotropy (Δ∈) is a difference between the average dielectric constant measured parallel to the long axis of a molecule and the average dielectric constant measured perpendicular to the long axis of the molecule. Dielectric anisotropy and rotational viscosity (γ) were measured using LC property station (available from Taicol Company, USA).

In addition, the voltage holding ratio (VHR) was measured by the following procedure. Two ITO substrates independently coated with the same liquid crystal orienting film were subjected to a rubbing process using a rubbing machine (ESR-1, available from E-SUN Precision Industrial Co., Ltd., conducted under the following settings: pile impression: 0.5 mm, rubbing roller diameter: 170 mm (700 rpm), stage speed 100 mm/min, and the rubbing cloth used was YA-25). One of the ITO substrates was coated with a sealant on a periphery of the liquid crystal orienting film. A plurality of spacers were disposed on the other of the ITO substrates so that, upon lamination, the two ITO substrates were spaced apart from each other by the spacers so as to form a space therebetween. After lamination, the two liquid crystal orienting films respectively formed on the ITO substrates faced each other and were spaced apart from each other by the spacers. The liquid crystal composition thus obtained in the examples was filled into the space between the liquid crystal orienting films through a gap in the sealant, followed by sealing the gap using an adhesive and curing the adhesive using ultraviolet light so as to form an assembly. The assembly was heated at 90° C. for 10 minutes so as to obtain a sample to be tested. Each sample was applied with a positive pulse voltage and a negative pulse voltage using a VHR measuring system (VHR-1A, available from Toyo corporation, Japan), with the sample being disposed in an open environment at the intervals between applications of the positive and negative pulse voltages. The positive and negative pulse voltages vs. time were recorded. The average area of the area of the positive pulse voltage multiplied by time and the area of the negative pulse voltage multiplied by time was calculated to obtain the VHR value.

The results are shown in Table 2.

TABLE 2

| | Example 1 | Example 2 | Example 3 | Example 4 | Example 5 |
|---|---|---|---|---|---|
| $T_{ni}$, °C. | 77.9 | 78.9 | 70.3 | 70.6 | 75.2 |
| Δn | 0.1100 | 0.1000 | 0.1140 | 0.1220 | 0.1092 |
| Δ∈ | 4.68 | 3.60 | 3.56 | 3.49 | 3.55 |
| γ (mPa·s) | 67.28 | 44.5 | 48 | 49 | 53 |
| VHR, % | >99.0% | >99.0% | >99.0% | >99.0% | >99.0% |

It is noted from Table 2, in each Example, $T_{ni}$ is greater than 70° C., Δn ranges from 0.100 to 0.130, Δ∈ is greater than 3.4, VHR is greater than 99%, and the rotational viscosity (γ) is less than 70 mPa·s.

With the inclusion of 5 to 15 wt % of the compound (E), the liquid crystal composition of this invention provides improved rotational viscosity, thereby resulting in an increase in the response speed.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:
1. A liquid crystal composition comprising:
20 to 50 wt % of compound (A)

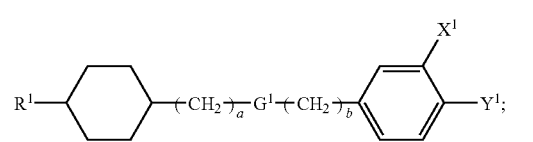

(A)

0 to 20 wt % of compound (B)

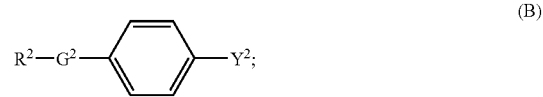

(B)

20 to 50 wt % of compound (C)

(C);

1 to 15 wt % of compound (D)

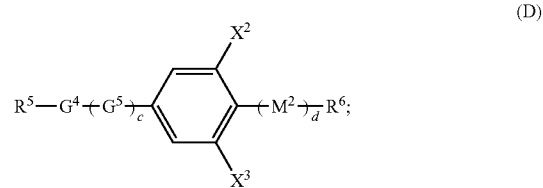

(D)

and
5 to 15 wt % of compound (E)

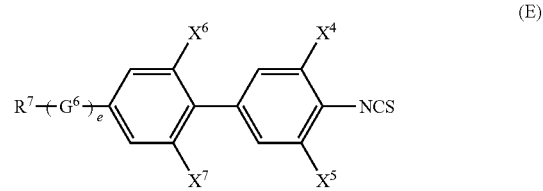

(E)

wherein $G^1$, $G^2$, $G^3$, $G^4$, $G^5$, $G^6$, $M^1$, and $M^2$ are independently phenylene or cyclohexylene; $R^1$, $R^2$, $R^3$, $R^4$, $R^5$, $R^6$, and $R^7$ are independently a straight-chain or branched-chain alkyl group having 1 to 7 carbon atoms or an alkenyl group having 2 to 7 carbon atoms, where said alkyl group is optionally substituted and can be replaced with at least one fluorine atom; $X^1$, $X^2$, $X^3$, $X^4$, $X^5$, $X^6$, $X^7$, $Y^1$, and $Y^2$ are independently selected from the group consisting of H, F, Cl, $CF_3$, and $OCF_3$; a and b are independently 0, 1 or 2; c is 0 or 1; d is 0 or 1, but c+d≧1; and e is 0, 1 or 2; and
wherein, when $G^4$ is cyclohexylene, c=1, and d=0, $R^6$ cannot be $CF_3$.

2. The liquid crystal composition of claim 1, wherein $R^1$, $R^2$, $R^3$, $R^4$, $R^5$, $R^6$, and $R^7$ are independently a straight-chain or branched-chain alkyl group having 2 to 5 carbon atoms, said alkyl group being un-substituted or substituted by a fluorine atom, or an alkenyl group having 2 to 4 carbon atoms.

3. The liquid crystal composition of claim 2, wherein said compound (A) is selected from the group consisting of:

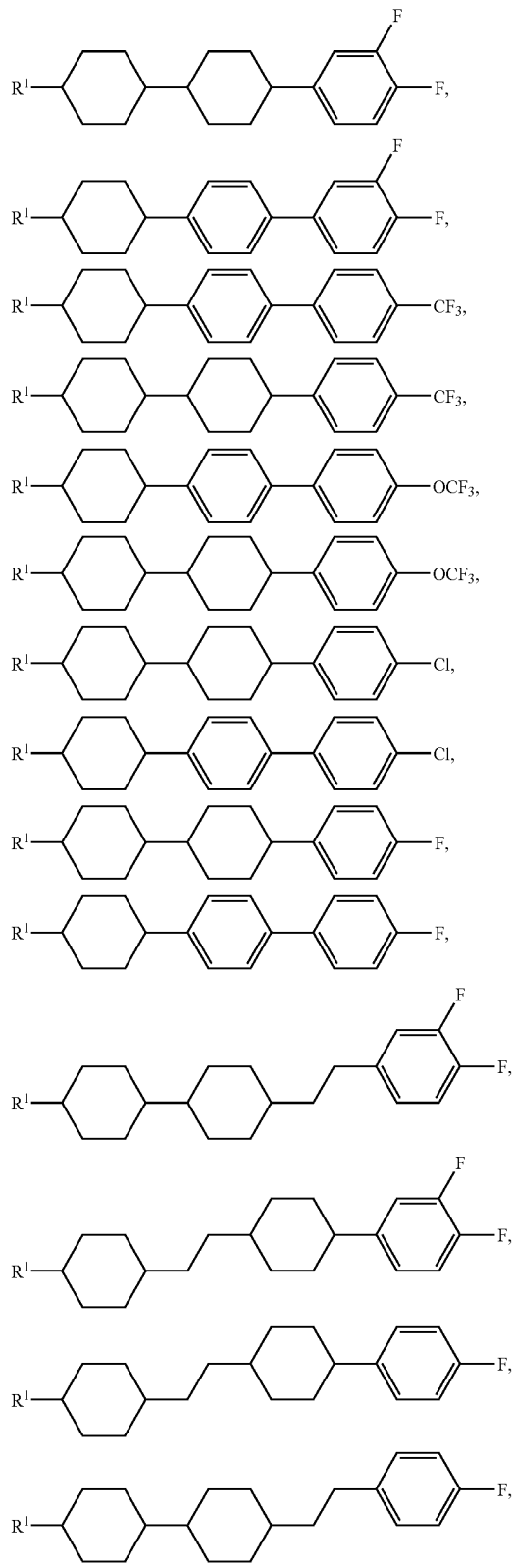

and combinations thereof.

4. The liquid crystal composition of claim 3, wherein said compound (A) is selected from the group consisting of:

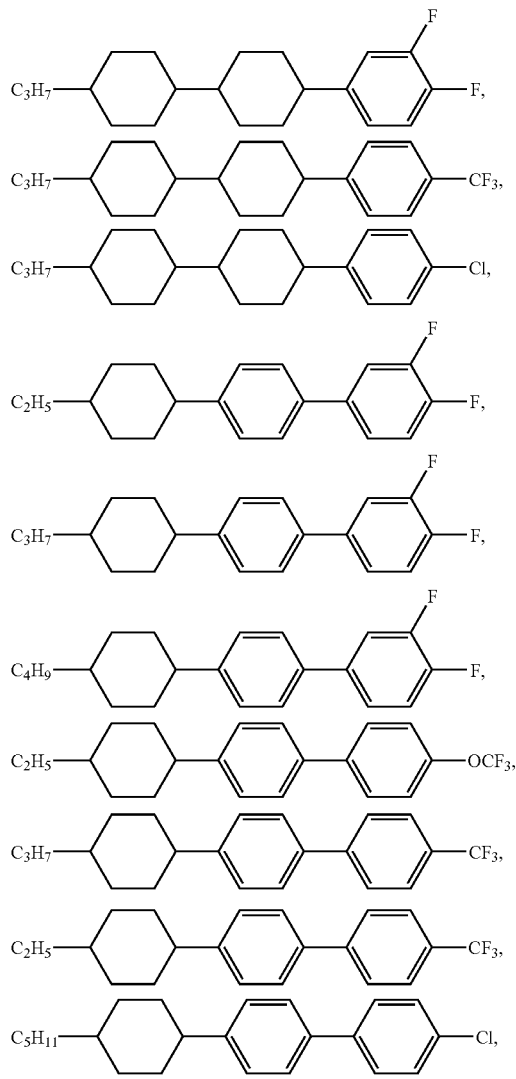

and combinations thereof.

5. The liquid crystal composition of claim 2, wherein said compound (B) is selected from the group consisting of:

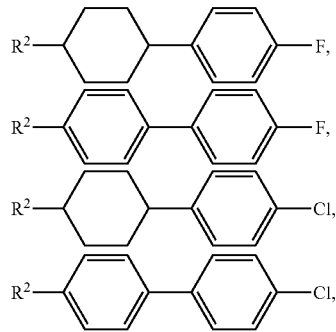

and combinations thereof.

6. The liquid crystal composition of claim 5, wherein said compound (B) is selected from the group consisting of:

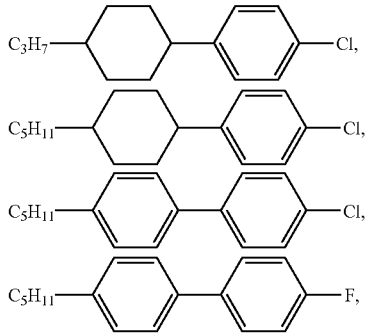

and combinations thereof.

7. The liquid crystal composition of claim 2, wherein said compound (C) is selected from the group consisting of:

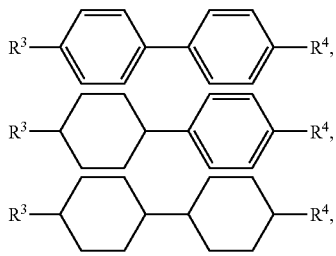

and combinations thereof.

8. The liquid crystal composition of claim 7, wherein said compound (C) is selected from the group consisting of:

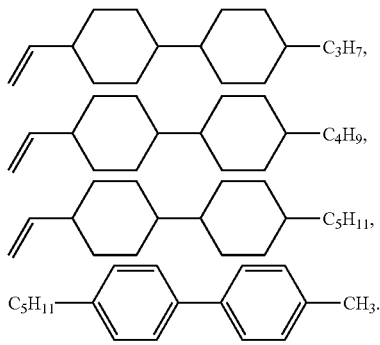

and combinations thereof.

9. The liquid crystal composition of claim 2, wherein said compound (D) is selected from the group consisting of:

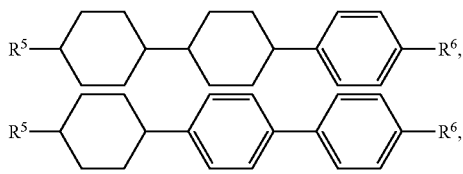

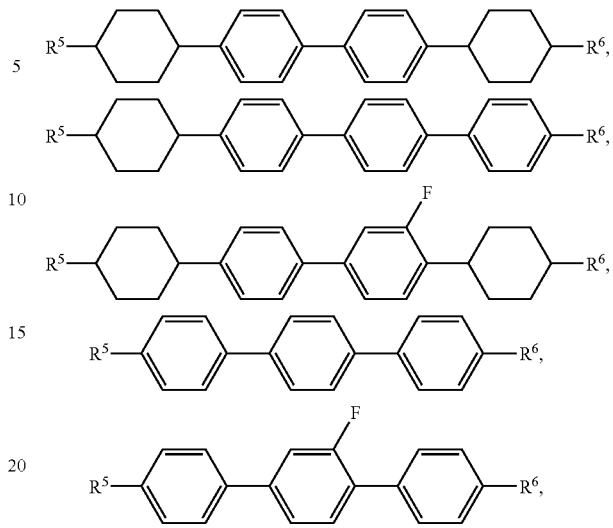

and combinations thereof.

10. The liquid crystal composition of claim 9, wherein said compound (D) is selected from the group consisting of:

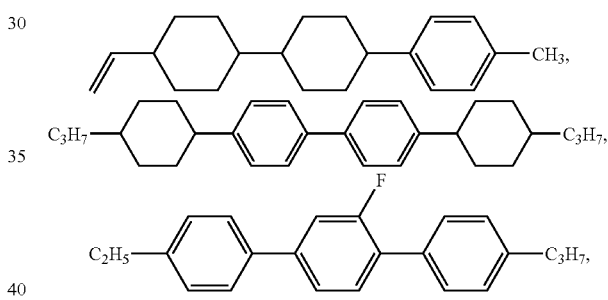

and combinations thereof.

11. The liquid crystal composition of claim 2, wherein said compound (E) is selected from the group consisting of:

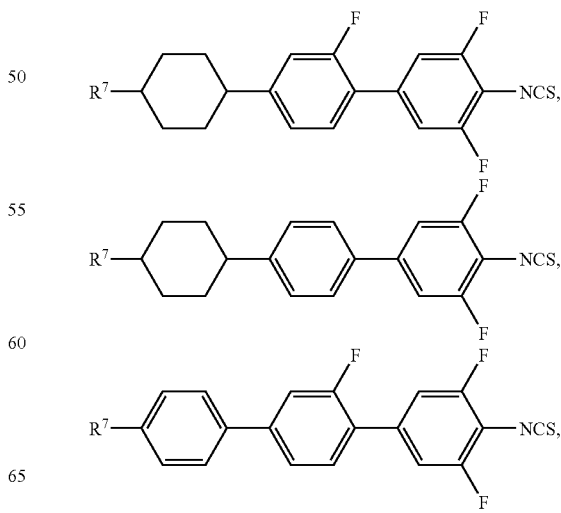

-continued

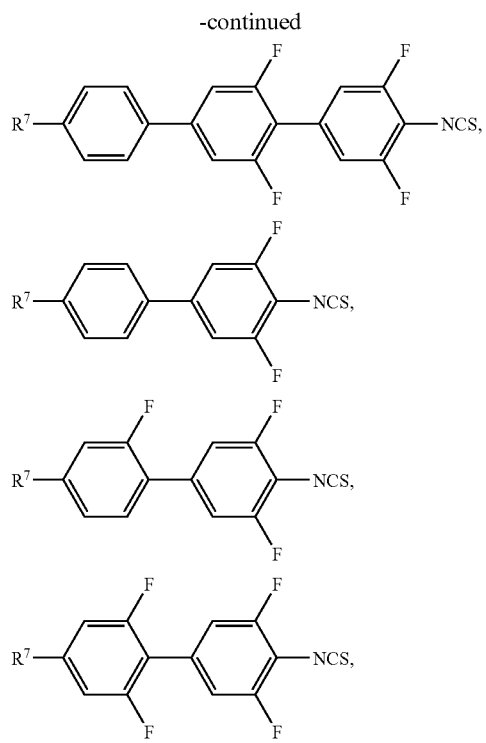

and combinations thereof.

12. The liquid crystal composition of claim 11, wherein said compound (E) is

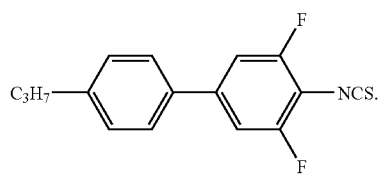

13. The liquid crystal composition of claim 12, wherein said liquid crystal composition has a rotational viscosity ranging from 5 to 70 mPa·s.

14. The liquid crystal composition of claim 12, wherein said liquid crystal composition has a rotational viscosity ranging from 40 to 70 mPa·s.

15. The liquid crystal composition of claim 1, wherein said compound (A) is selected from the group consisting of:

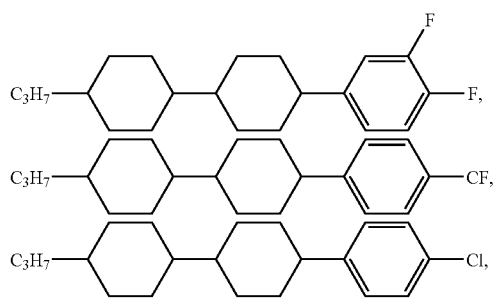

-continued

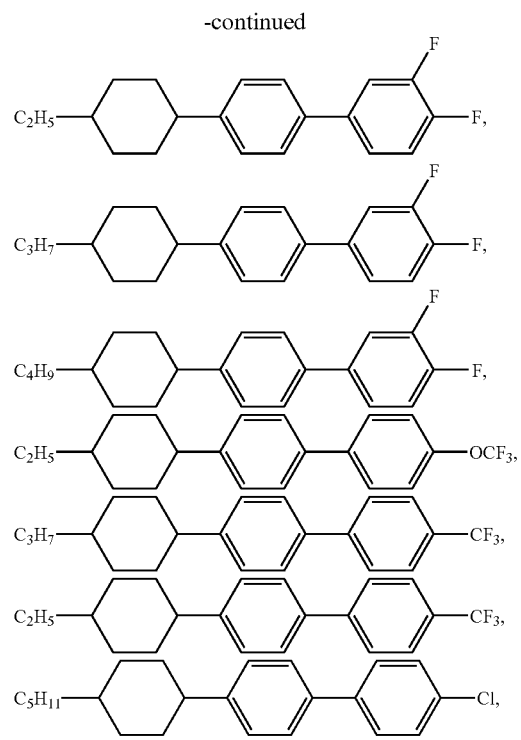

and combinations thereof; said compound (B) being selected from the group consisting of:

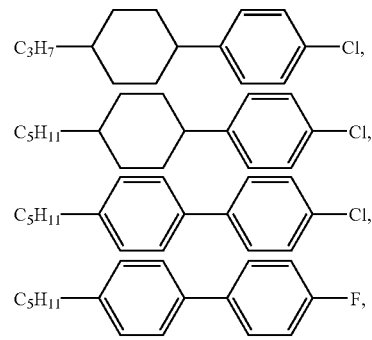

and combinations thereof; said compound (C) being selected from the group consisting of:

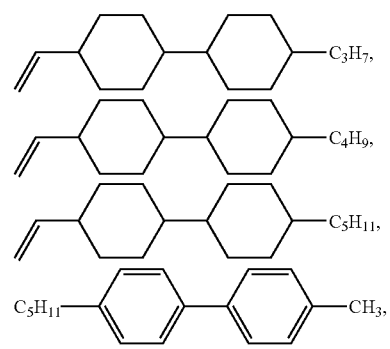

and combinations thereof; said compound (D) being selected from the group consisting of:
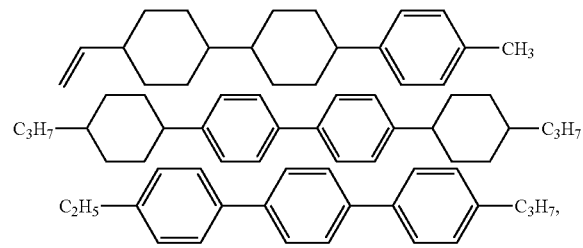
and combinations thereof; said compound (E) being
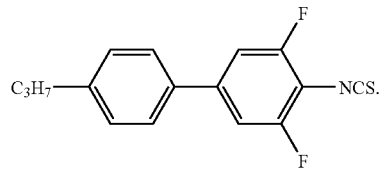
* * * * *